(12) United States Patent
Atarius (10) Patent No.: US 6,356,608 B1
(45) Date of Patent: Mar. 12, 2002

(54) METHOD, APPARATUS, AND SYSTEM FOR DETERMINING A LOCATION OF A FREQUENCY SYNCHRONIZATION SIGNAL

(75) Inventor: Roozbeh Atarius, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/106,227

(22) Filed: Jun. 29, 1998

(51) Int. Cl.[7] .................................................. H04L 7/04
(52) U.S. Cl. ........................................ 375/362; 375/342
(58) Field of Search ................................ 375/362, 355, 375/365, 371, 372, 259, 261, 298, 324, 340, 342, 364; 370/503, 507, 516, 514; 455/500, 502; 708/309, 311; 327/47, 46

(56) References Cited

U.S. PATENT DOCUMENTS

| | | | |
|---|---|---|---|
| 4,468,625 A | * | 8/1984 | Tandart et al. |
| 4,527,275 A | | 7/1985 | Russell |
| 5,305,347 A | | 4/1994 | Roschmann et al. |
| 5,363,415 A | | 11/1994 | Iwasaki |
| 5,390,216 A | | 2/1995 | Bilitza et al. |
| 5,596,582 A | | 1/1997 | Sato et al. |
| 5,761,250 A | | 6/1998 | Lin |
| 6,133,959 A | * | 10/2000 | Kwak .......................... 348/525 |

FOREIGN PATENT DOCUMENTS

| | | |
|---|---|---|
| EP | 0 387 720 | 9/1990 |
| EP | 0 717 512 | 6/1996 |
| GB | 2 315 198 | 1/1998 |
| JP | 07321762 | 12/1995 |
| JP | 08331114 | 12/1996 |
| JP | 09093301 | 4/1997 |
| WO | 9211706 | 7/1992 |
| WO | 98 24251 | 6/1998 |

OTHER PUBLICATIONS

Charbit G. et al., "Frame Synchronization and Frequency-carrier estimation for GSM Mobile Communications", Sep. 30–Oct. 2, 1997 No. 145, pp. 449–457.

* cited by examiner

*Primary Examiner*—Jean Corrielus
(74) *Attorney, Agent, or Firm*—Burns, Doane, Swecker & Mathis, L.L.P.

(57) ABSTRACT

A method, apparatus, and system determine a location of a frequency synchronization signal in a frame of data transmitted from a transmitter and received by a receiver in a communication system including at least one transmitter and at least one receiver. A peak value representing a detected frequency synchronization signal transmitted from the transmitter to the receiver is calculated. A frequency offset between a carrier frequency of the transmitter and a frequency reference of the receiver is estimated, along with a quality factor for the estimated frequency offset. A determination is made whether the peak value is greater than or equal to a peak threshold and whether the quality factor is less than or equal to a quality threshold. When both of the predetermined threshold conditions are met, the peak value, frequency offset, and quality factor are stored. When either of the threshold conditions is not met, the location of the frequency synchronization signal corresponds to the location of a stored maximum peak value and a stored minimum quality factor.

27 Claims, 8 Drawing Sheets

METHOD, APPARATUS, AND SYSTEM FOR DETERMINING A LOCATION OF A FREQUENCY SYNCHRONIZATION SIGNAL

BACKGROUND

This invention relates generally to a method, apparatus, and system for determining a location of a frequency synchronization signal. More particularly, this invention relates to a method, apparatus, and system for determining a location of a frequency synchronization signal among data transmitted from a transmitter and received by a receiver in a communication system.

In any communication system, it is important for a receiver to be synchronized with a transmitter so that messages can be successfully exchanged between the transmitter and the receiver. In a radio communication system, in particular, it is important that a receiver be tuned to the frequency of the transmitter for optimal reception.

In a typical radio communication system, remote stations communicate with one or more base stations via a radio air interface. Various approaches have been employed to prevent transmissions between the various base stations and remote stations from interfering with each other.

In some radio communication systems, neighboring base stations are each assigned a different carrier frequency with which to communicate with remote stations so that transmissions from one base station do not interfere with transmissions from a neighboring base station. In addition to such a Frequency Division Multiple Access (FDMA) technique, Time Division Multiple Access (TDMA) has been employed. In systems using TDMA, a base station may allocate a particular time slot or slots within a frame on a carrier to each remote station. Some remote stations can use the same carrier frequency but different time slots to communicate with the base station.

In other radio communication systems, the Code Division Multiple Access (CDMA) method has been employed. According to the CDMA method, each remote station is assigned a particular digital code word(s) that is orthogonal to code words assigned to other stations. Neighboring base stations can exchange messages with remote stations using the same frequency but different digital orthogonal code words to indicate which remote station the messages are designated for.

Whether a radio communication system employs FDMA, TDMA, CDMA, a combination of these approaches, or some other approach, it is important for a remote station to be time and frequency synchronized to the base station serving the area from which it desires to communicate. In other words, the frequency reference of the remote station must be tuned to the carrier frequency of the base station, and the time reference of the remote station must be synchronized to the time reference of the base station. A periodic synchronization signal is typically transmitted from the base station to the remote station for this purpose.

In a system complying with the European Global System for Mobile Communication (GSM) standard, information is transmitted from the base station to a remote station by modulating the carrier of the base station with, e.g., a Normal Burst (NB) of data. To synchronize the mobile station to the base station, the carrier of the base station is also modulated from time to time with a Frequency Correction Burst (FCB) and a Synchronization Burst (SB) to form a frequency synchronization signal.

The carrier of the base station is typically modulated with the FCB using Gaussian Minimum Shift Keying (GMSK). In a GSM system, a FCB is a sequence of 148 symbols, each symbol a zero, that transforms into a pure sinusoidal signal after modulation. The frequency of the resulting frequency synchronization signal is thus equal to 1/4T Hz, where T represents a symbol duration. T is typically 48/13 microseconds ($\mu s$), so that the frequency synchronization signal has a frequency of approximately 67.7 KHz. The FCB is repeated every tenth frame for the first four times, and then for the fifth time, the FCB is repeated on the eleventh frame. This frame sequence is then repeated indefinitely, to maintain synchronization between the remote station and the base station.

From the information in the FCB, the remote station is able to roughly synchronize itself with the time slot(s) allocated to it. This rough time synchronization is then sufficient to locate the SB, which is typically located eight bursts after the FCB, and to decode the information it carries. The information obtained by decoding the SB is then used to finely tune the frequency reference of the remote station to the carrier frequency of the base station and to adjust the remote station's time reference to the time slot(s) allocated to it by the base station.

In systems employing CDMA, each base station transmits a frequency synchronization signal in the form of, for example, a pilot sequence on each of the frequencies assigned to that particular base station as well as possibly on some or all of the frequencies that are not assigned to that particular base station. If the frequency has been assigned to the base station, the corresponding pilot sequence may be transmitted with slightly more power than the other frequencies used by the base station. Each remote station receiving the carrier modulated by the pilot sequence demodulates the signal. As a result, each remote station can receive signals designated for it and simultaneously measure the signal strengths of neighboring base stations using different pilots or carriers. This information is used by the remote station to determine which received pilot sequence has the strongest signal strength, and the frequency reference of the remote station is adjusted to the appropriate carrier frequency, accordingly.

Any frequency difference between the frequency reference of the remote station and the carrier frequency of the base station is readily detected in the demodulated frequency synchronization signal. For example, in systems complying with the GSM standard, the difference between the frequency of the modulated frequency synchronization signal, which is known to be 67.7 KHz, and the frequency of the received frequency synchronization signal, demodulated to the baseband, is a direct measure of the error in the frequency reference of the remote station. In systems employing CDMA, the difference between the known frequency of the strongest transmitted pilot sequence and the frequency of the demodulated pilot sequence is used by the remote station as a measure of the error in the frequency reference of the remote station.

In order to synchronize a remote station to a base station, it is therefore important to accurately detect the frequency synchronization signal transmitted from the base station and to estimate the frequency difference between the remote station's frequency reference and the carrier frequency of the base station.

Many techniques have been proposed for detecting the frequency synchronization signal. One such technique is disclosed in a commonly assigned U.S. patent application Ser. No. 09/026,724 entitled "Method and Apparatus for Detecting a Frequency Synchronization Signal", filed on Feb. 20, 1998 in the names of Roozbeh Atarius et al., now U.S. Pat. No. 6,226,336 and herein incorporated by reference. This detection method uses the similarities between the in-phase and quadrature-phase components of received signals to detect a frequency synchronization signal.

Many techniques have also been proposed for estimating the frequency difference between the remote station's frequency reference and the carrier frequency of the base station. One such technique is disclosed in commonly assigned U.S. patent application Ser. No. 08/971,666, filed on Nov. 17, 1997, now U.S. Pat. No. 6,104,767 and herein incorporated by reference. This estimation method uses the phase differences between successive samples of a detected frequency synchronization signal to estimate the frequency offset.

To accurately estimate the frequency offset and thus tune the remote station to the carrier frequency of the base station, it is important to know the actual location of the frequency synchronization signal among data received by the remote station, e.g., where the FCB occurs in a frame. Otherwise, the signal used in the frequency offset estimation may not correspond entirely to the frequency synchronization signal, which may result in less than optimal tuning. Thus, there is a need to determine the location of a detected frequency synchronization signal among data received by a receiver.

SUMMARY

It is therefore an object of the present invention to determine the location of a frequency synchronization signal. According to an exemplary embodiment of the present invention, this and other objects are met by a method, apparatus, and system for determining the location of the frequency synchronization signal among data transmitted from a transmitter and received by a receiver. A peak value representing a signal detected by the receiver is calculated, a frequency offset between the frequency reference of the receiver and the carrier frequency of the transmitter is estimated, and a quality factor indicating the accuracy of the estimated frequency offset is estimated.

The location of the frequency synchronization signal is determined by comparing the calculated peak value and the estimated quality factor with predetermined peak and quality thresholds, e.g., determining whether the peak value is greater than or equal to a peak threshold and whether the quality factor is less than or equal to a quality threshold. When both of the predetermined threshold conditions are met, the peak value, frequency offset, and quality factor are stored. When either of the threshold conditions is not met, the location of the frequency synchronization signal corresponds to the location of a stored maximum peak value and a stored minimum quality factor.

BRIEF DESCRIPTION OF THE DRAWINGS

The features, objects, and advantages of the invention will become apparent by reading this description in conjunction with the accompanying drawings, in which like reference numerals refer to like elements and in which.

DETAILED DESCRIPTION

For illustrative purposes, the following description is directed to a radio communication system complying with the GSM standard. It will be understood that this invention is not so limited but applies to other types of communication systems employing different standards.

Figure 1:
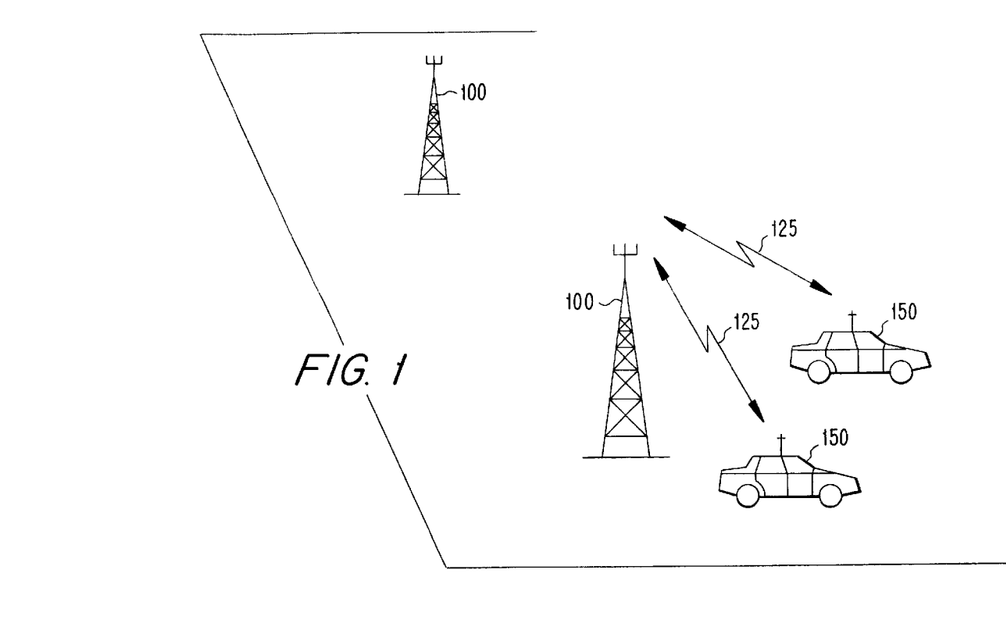
FIG. 1 illustrates a communication system in which the present invention can be implemented.

FIG. 1 illustrates an exemplary communication system in which the present invention can be implemented. The system includes at least one transmitter 100 and at least one receiver 150. Although the transmitter 100 and the receiver 150 are depicted in FIG. 1 as a base station and a mobile station, respectively, it will be appreciated that the transmitter can be implemented in many ways, e.g., as a terrestrial or satellite repeater, and the receiver can be implemented in many ways, e.g., as a fixed cellular terminal (wireless local loop). A base station and a mobile station are depicted in FIG. 1 and described in the following for illustrative purposes only.

The base station 100 and the mobile station 150 communicate via a radio air interface 125. Each neighboring base station 100 is assigned a particular carrier frequency, and each base station 100 allocates specific time slots for each mobile station 150.

To communicate with a base station 100, a mobile station 150 must be time and frequency synchronized to the base station 100. In other words, the frequency reference and time reference of the mobile station 150 must be synchronized with the carrier frequency assigned to the base station 100 and the time slot(s) allocated by the base station, respectively. In a CDMA system, the mobile station 150 must be synchronized with the base station's carrier frequency and the code words transmitted.

To synchronize the mobile station 150, the base station 100 transmits a frequency synchronization signal to the mobile station. For example, in systems employing the GSM standard, the base station 100 modulates its carrier frequency with a FCB to form a frequency synchronization signal.

The mobile station 150 receives and demodulates signals transmitted from the base station 100, including the frequency synchronization signal. According to an exemplary embodiment, the frequency synchronization signal may be detected by any of various methods, several of which are disclosed in the aforementioned U.S. Pat. No. 6,226,336 entitled "Method and Apparatus for Detecting a Frequency Synchronization Signal". For illustrative purposes, one of the methods disclosed in this patent application will be described.

The similarity of the in-phase and quadrature components of the received frequency synchronization signal can be used to detect the frequency synchronization signal, e.g., the FCB.

The in-phase and the quadrature components of the received synchronization signal y(n) can be represented as:

$$y_I(n) = \sqrt{P}\cos\left(2\pi n\left(\frac{\Delta F}{F_s} + \frac{1}{4}\right)\right) + v_I(n) \qquad (1)$$

$$y_Q(n) = \sqrt{P}\sin\left(2\pi n\left(\frac{\Delta F}{F_s} + \frac{1}{4}\right)\right) + v_Q(n) \qquad (2)$$

where $\sqrt{P}$, $\Delta F$, $v_I(n)$, and $v_Q(n)$ denote the carrier amplitude, the frequency offset between the frequency reference and the carrier frequency $F_s$, the in-phase noise component, and the quadrature noise component, respectively.

If the mobile station is synchronized to the base station, i.e., $\Delta F=0$, every period of the sinusoid of the FCB contains four samples. Moreover, the $y_I(n)$ and $y_Q(n)$ components of the FCB are phase shifted by $\pi/2$ and thus differ from each other by one sample. Thus, for a received signal corresponding to an FCB, $y_Q(n)$ can be obtained by delaying $y_I(n)$ by one time index.

If the mobile station is not synchronized to the base station, i.e., $\Delta F \neq 0$, then $y_Q(n)$ does not equal $y_I(n-1)$, since:

$$y_I(n-1) = \sqrt{P}\sin\left(2\pi n\left(\frac{\Delta F}{F_s} + \frac{1}{4}\right) - 2\pi\frac{\Delta F}{F_s}\right) \qquad (3)$$

For a signal corresponding to an FCB, cross-correlating $y_I(n-1)$ and $y_Q(n)$ produces the following cross-correlation value $r_{IQ}(1)$:

$$r_{IQ}(1) = \frac{P}{2}\cos\left(2\pi\frac{\Delta F}{F_s}\right) \quad \forall n \in \Psi \qquad (4)$$

As can be seen from Equation 4, cross correlating $y_I(n-1)$ and $y_Q(n)$ results in a peak whenever the received signal corresponds to an FCB. The magnitude of the peak is dependent on the carrier amplitude and the frequency offset $\Delta F$. As $\Delta F$ grows, the magnitude of the peak decreases. If a signal corresponding to, for example, an NB or noise is received, there is no correlation between $y_I(n-1)$ and $y_Q(n)$. Thus, by determining whether the cross-correlation value has a peak which is at least as great as a predetermined detection threshold, it can be determined whether or not the signal transmitted from the base station corresponds to an FCB.

There are several potential problems to take into consideration when implementing cross-correlation to detect the FCB. One problem is the variation in carrier amplitude, due both to fading and propagation loss. The variation in carrier amplitude affects the peak value of Equation 4 and makes it difficult to select a detection threshold.

To reduce the effect of the carrier amplitude variation, the incoming data $y(n)$ can be normalized by converting the received signal $y(n)$ from the Cartesian domain to the Polar domain and then reconverting the signal back to the Cartesian domain. This can be implemented with two tables, one for the conversion from the Cartesian domain to the Polar domain and the other for conversion from the Polar domain to the Cartesian domain. The normalization is performed by using the first table to obtain the signal phase corresponding to the in-phase and quadrature components of the received signal and the second table to obtain the normalized in-phase and quadrature components from the signal phase and unity amplitude.

In order to detect the FCB using the cross-correlation technique described above, the quantity on the right side of Equation 4 must first be determined. One way to determine this value is to estimate the cross-correlation value $r_{IQ}(1)$ as follows:

$$e\{r_{IQ}(1)\} = \frac{1}{\text{length }(\Psi)}\sum_{n \in \Psi} y_I(n-1)y_Q(n) \qquad (5)$$

where $e\{r_{IQ}(1)\}$ denotes an estimated cross-correlation value, and length ($\Psi$) corresponds to the length of the FCB, i.e., the number of symbols in the FCB. Thus, by multiplying $y_I(n-1)$ by $y_Q(n)$ for each of a number of samples of the received signal corresponding to the length of an FCB and averaging these products, the cross-correlation value of Equation 4 can be estimated.

To reduce the amount of memory required for this averaging, the method of estimation in Equation 5 can be modeled as a Moving Average (MA) process with the transfer function:

$$B(z) = b_0 + b_1 z^{-1} + \ldots + b_{147} z^{-147} \qquad (6)$$

where all the coefficients $\{b_k\}$ are equal to $1/148$. This MA process can be implemented with a filter with a 148 sample long memory.

The MA process can be rewritten as an Auto Regressive (AR) process having the transfer function:

$$\frac{1}{A(z)} = B(z) + R(z) \qquad (7)$$

where $A(z)$ is a polynomial with an order less than $B(z)$, and $R(z)$ is a rest term. The quantity of the rest term $R(z)$, also referred to as bias, depends on how closely $1/A(z)$ approximates $B(z)$. Ideally, $1/A(z)$ should not significantly deviate from $B(z)$, and the bias $R(z)$ should be small. Equation 7 can be approximated as follows:

$$\frac{1}{A(z)} = \frac{C}{1 - \alpha z^{-1}} \qquad (8)$$

where $0 < \alpha < 1$, and the constant $C$ is to used adjust the gain at $z=0$ to unity. A simple choice for $\alpha$ is $1 - 1/128$ which makes $C$ equal to $1/128$. The benefit of having $\alpha$ related to a power of two is that the division by 128 can be implemented with a simple right shift by seven bits. The approximation in Equation 8 is an exponential averaging which can be implemented with a filter having a memory that is approximately $(1-\alpha)^{-}=128$ samples long.

Figure 2:
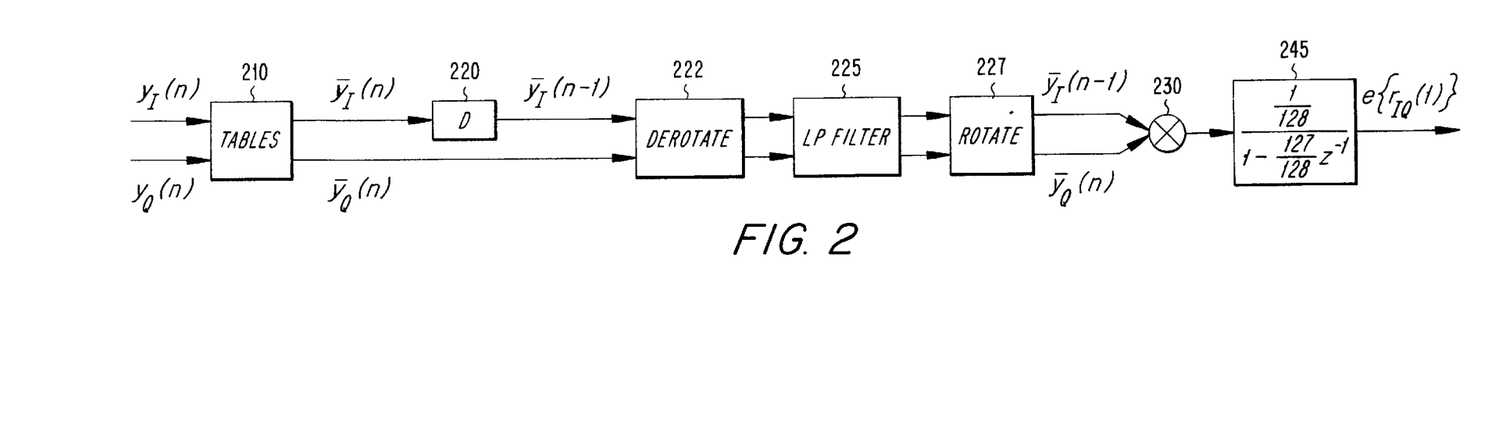
FIG. 2 illustrates an exemplary apparatus for detecting a frequency synchronization signal.

FIG. 2 illustrates an exemplary apparatus for detecting a frequency synchronization signal. The apparatus includes a Normalizer 210 into which in-phase and quadrature components $y_I(n)$ and $y_Q(n)$ of a signal $y(n)$ received from the base station are input at a given time n. These components can be obtained according to any suitable technique, such as that disclosed in U.S. Pat. No. 5,276,706 to Critchlow.

The Normalizer 210 normalizes the components $y_I(n)$ and $y_Q(n)$, thus reducing effects of, e.g., fading. As shown in FIG. 2 and described above, the Normalizer 210 can be implemented with conversion tables. The normalized in-phase component is passed through a Delay 220 and delayed by one sample. The delayed in-phase component and the normalized quadrature component are derotated, i.e., shifted to the baseband, in a Derotator 222, low pass filtered in a LP Filter 225 to remove surrounding noise, and rotated, i.e., shifted back to the center frequency, in the Rotator 227. Then, the components are multiplied together by the Multiplier 230 and averaged, e.g., by an Averager 245 to produce an estimated cross-correlation value $e\{r_{IQ}(1)\}$. The Averager

245 can be implemented with, for example, a Moving Averager having the transfer function:

$$H(z) = \frac{\frac{1}{128}}{1 - \frac{127}{128}z^{-1}} \quad (9)$$

which corresponds to the substitution of C=1/128 and α=1−1/128 in Equation 8. The Moving Averager can be implemented with a LP filter, which makes this method less complicated than averaging with an FIR filter. If the estimated cross-correlation value has a peak which is at least as great as a predetermined detection threshold, then the signal transmitted from the base station corresponds to an FCB.

Although the frequency selective filter shown in FIG. 2 is arranged between the Delay 220 and the Multiplier 230, it should be understood that the frequency selective filter can be arranged in any other suitable place, e.g., in front of the Normalizer 210.

The estimated cross-correlation value $e\{y_{IQ}(1)\}$ can be used in place of the actual cross-correlation value $r_{IQ}(1)$ to determine the frequency offset between the carrier frequency of the base station and the frequency reference of the mobile station.

Figure 3:
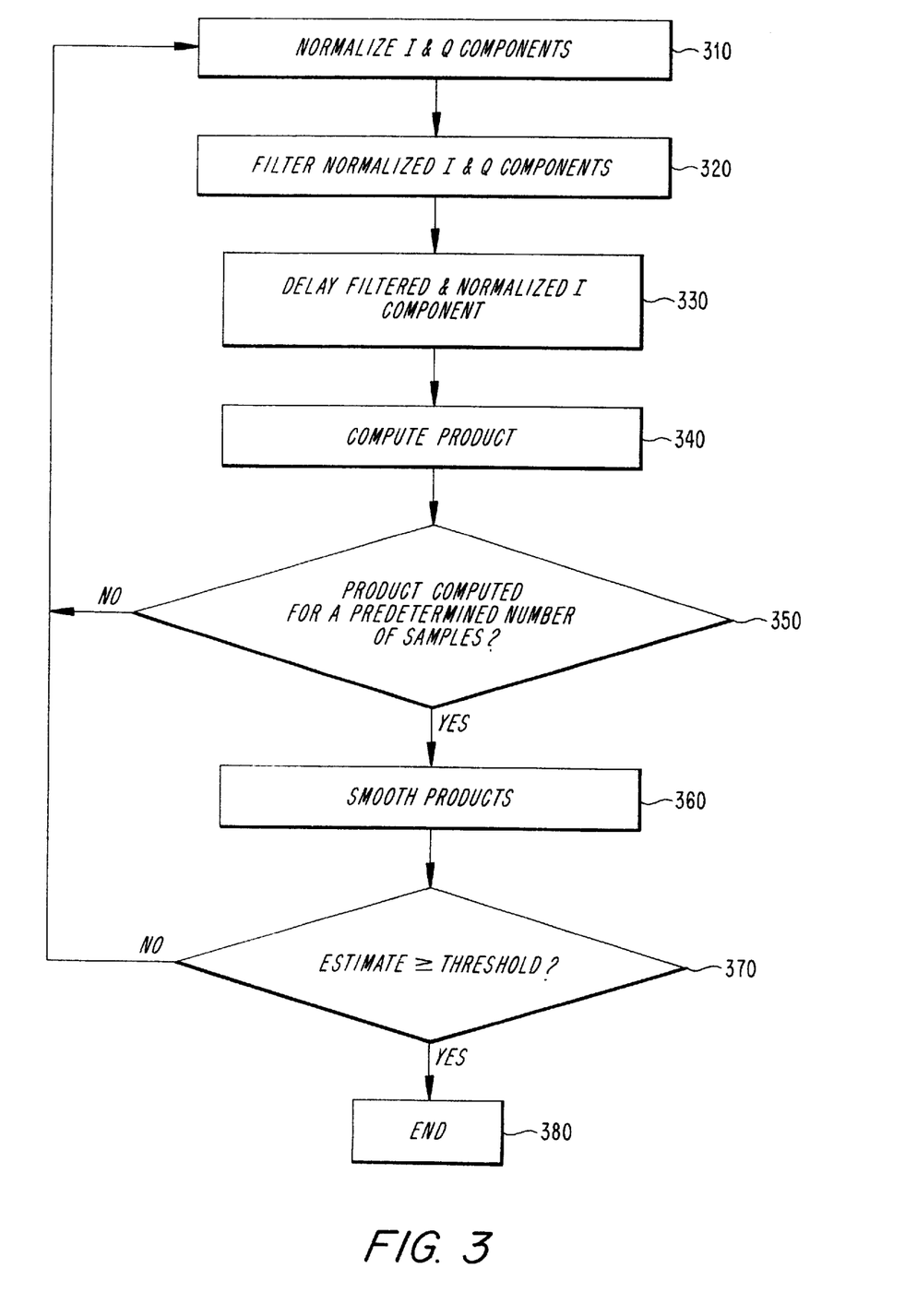
FIG. 3 illustrates an exemplary method for detecting a frequency synchronization signal.

FIG. 3 illustrates an exemplary method for detecting a frequency synchronization signal. The method begins at step 310 at which in-phase (I) and quadrature (Q) components of a received signal are normalized. At step 320, the normalized I and Q components are filtered to remove surrounding noise. Then, at step 330, the filtered and normalized I component is delayed. The order of the steps 320 and 330 can be reversed, i.e., the normalized I and Q components can be filtered after the I component is delayed. At step 340, the normalized and filtered Q component is multiplied by the delayed, filtered, and normalized I components. At step 350, a determination is made whether these components have been multiplied for a predetermined number of samples of the received signal, e.g., a number of samples corresponding to the length of the FCB. If not, the process returns to step 310. When the components have been multiplied for a predetermined number of samples, the multiplication products are smoothed, e.g., averaged, at step 360 to produce an estimated cross-correlation value. At step 370, a determination is made whether the result is greater than a predetermined threshold. If not, the detected signal does not correspond to a frequency synchronization signal, and the method returns to step 310. If the estimated cross-correlation value is greater than a predetermined threshold, the detected signal corresponds to a frequency synchronization signal, and the detection process ends at step 380. The detected frequency synchronization signal can be used to estimate the frequency offset in the received frequency synchronization signal, and the mobile station can be synchronized to the base station based on the estimated frequency offset. Once the mobile station is synchronized to the base station, the method shown in FIG. 3 can be repeated to maintain synchronization.

According to an exemplary embodiment, the frequency offset between the frequency reference of the mobile station and the carrier frequency of the base station can be estimated by any of various methods, including those disclosed in the afore-mentioned U.S. patent application Ser. No. 08/971,666 now U.S. Pat. No. 6,104,767. For illustrative purposes, one of the methods disclosed in this application will be described.

For a signal to noise ratio (SNR) equal to $P/\sigma_v^2 \gg 1$, the phase of the actual received synchronization signal y(n), with the initial phase θ set to zero, can be represented as:

$$\phi_y(n) = \phi_x(n) + v_\phi(n), \quad (10)$$

where $v_\phi(n)$ denotes the zero-mean white Gaussian phase noise.

Assuming there is a frequency offset ΔF in the actual received signal y(n), Equation 10 can be rewritten as:

$$\phi_y(n) = 2\pi n\left(\frac{\Delta F}{F_s} + \frac{1}{4}\right) + v_\phi(n), \quad (11)$$

which corresponds to a straight line with a slope of 2π (ΔF/Fs+¼) with white noise. Thus, the estimation of the frequency offset ΔF is related to the estimation of the slope in Equation 11. Subtracting the known factor of 2π/4, this slope can be estimated using the method of linear regression by minimizing the following sum of squared errors:

$$\Lambda = \sum_{\forall n \in \Psi} \left[\phi(n) - 2\pi n \frac{e\{\Delta F\}}{F_s}\right]^2 \quad (12)$$

where e{ΔF} denotes the estimated frequency offset and $\phi(n) = \phi_y(n) - 2\pi n/4$. This estimate is the Maximum Likelihood (ML) estimate if the noise $v_\phi(n)$ is Gaussian.

The set of time indices Ψ is dependent on the choice of the initial time $n_0$. It is convenient to choose $n_0$ so that the set of the indices Ψ is asymmetric, e.g., $\Psi = \{-(N_0-1)/2, \ldots 0, \ldots, (N_0-1)/2\}$ where the number of samples $N_0$ is odd. By employing this set of time indices, the frequency offset can be estimated as:

$$e\{\Delta F_0\} = \left(\frac{12}{T_s N_0 (N_0^2 - 1)} \sum_{k=0}^{N_0-1} \left(k - \frac{N_0-1}{2}\right)\phi(k)\right) \frac{F_s}{2\pi} \quad (13)$$

To reduce the amount of memory required to estimate the frequency offset, $N_0$ samples of the FCB can be grouped into N groups of M phase differences each, and then the sum of each group can be computed. In other words, block sums of phase differences between successively collected samples of the detected frequency synchronization signal can be used to estimate the frequency offset, rather than individual phase differences between successively collected samples. This reduces the number of calculations required for frequency offset estimation.

Segmenting the phase samples of the FCB into different blocks, the sum in Equation 13 is expressed as follows:

$$\sum_{k=0}^{N_0-1} \left(k - \frac{N_0-1}{2}\right)\phi(k) = \sum_{i=0}^{N-1} \sum_{j=0}^{M-1} \left(Mi + j - \frac{N_0-1}{2}\right)\phi(Mi + j) \quad (14)$$

where N and M are the number of blocks and the number of samples in each block, respectively. The total number of samples is $N_0 = NM$.

The right side of Equation 14 can be approximated by setting $$j = \frac{(M-1)}{2}$$

in $$Mi + j - \frac{N_0 - 1}{2}.$$

Introducing the block phase sum $$\phi_M(i) = \sum_{j=0}^{m-1} \phi(Mi + j),$$

Equation 14 can then be approximated as:

$$\sum_{k=0}^{N_0-1} \left(k - \frac{N_0 - 1}{2}\right)\phi(k) \approx M \sum_{k=0}^{N-1} \left(k - \frac{N-1}{2}\right)\phi_M(k), \quad (15)$$

Substituting this expression in Equation 13, the frequency offset $\Delta F_M$ can be estimated as:

$$e\{\Delta F_M\} = \left(\frac{12M}{T_s N_0 (N_0^2 - 1)} \sum_{k=0}^{N-1} \left(k - \frac{N-1}{2}\right)\phi_M(k)\right)\frac{F_s}{2\pi}, \quad (16)$$

To further reduce the amount of required memory, the method of linear regression can be modified to compensate for the phase variations without having to shift each sample and keep track of the phase shift in a memory. The phase difference between successively collected samples of the FCB can be used for this purpose.

The successive phase sums $\phi_M(k)$ are related to each other as follows:

$$\phi_M(k) = \phi_M(k-1) + \sum_{j=1}^{M} (\phi(kM + j) - \phi(kM + j - 1)) \quad (17)$$

Since the phase samples are equidistant, $\phi_M(k)$ is related to its initial value $\phi_M(k_0)$ and the sum $\Delta\phi_M(j)$ of the phase differences between successively collected samples of the FCB as follows:

$$\phi_M(k) = \phi_M(k_0) + \sum_{j=k_0+1}^{k_0+k} \Delta\phi_M(j) \quad (18)$$

Substituting the result in Equation 19 for $\phi_M(k)$ in Equation 16, the frequency offset $e\{\Delta F_M\}$ can be estimated as:

$$e\{\Delta F_M\} = \quad (19)$$

$$\left(\frac{12M}{T_s N_0 (N_0^2 - 1)} \sum_{k=0}^{N-1} \left(k - \frac{N-1}{2}\right)\left[\phi_M(k_0) + \sum_{j=k_0+1}^{k_0+k} \Delta\phi_M(j)\right]\right)\frac{F_s}{2\pi}$$

The phase initial value, $\phi_M(k_0)$ does not have any influence in Equation 19 since $$\sum_{k=0}^{N-1} \left(k - \frac{N-1}{2}\right) = 0.$$

There are different disturbances which affect the frequency offset estimation, e.g. noise, fading, etc. If the estimated frequency offset is not accurate, the frequency reference of the mobile station will not be properly synchronized to the carrier frequency of the base station. Thus, it is important to be able to determine the accuracy of the estimated frequency offset so that it can be adjusted if necessary.

U.S. patent application Ser. No. 08/971,666, now issued as U.S. Pat. No. 6,104,767, discloses a technique for estimating a quality factor δ which indicates accuracy of the estimated frequency offset. The estimated quality factor e{δ} can be computed by, for example, adding the absolute values of the differences between each of the N sums of M phase differences and the estimated frequency offset e{$\Delta F_M$}, as follows:

$$e\{\delta\}=|\Delta\phi_M(j)-\text{Me}\{\Delta F_M\}|+|\Delta\phi_M(j-1)-\text{Me}\{\Delta F_M\}|\ldots +|\Delta\phi_M(j-N+2)-\text{Me}\{\Delta F_M\}|+|\Delta\phi_M(j-N+1)-\text{Me}\{\Delta F_M\}| \quad (20)$$

Ideally, these differences and thus the resulting estimated quality factor e{δ} should be zero. Any deviation indicates the presence of noise and/or an estimation error. Thus, the lower the value of estimated quality factor e{δ}, the more accurate the estimated frequency offset.

Figure 4:
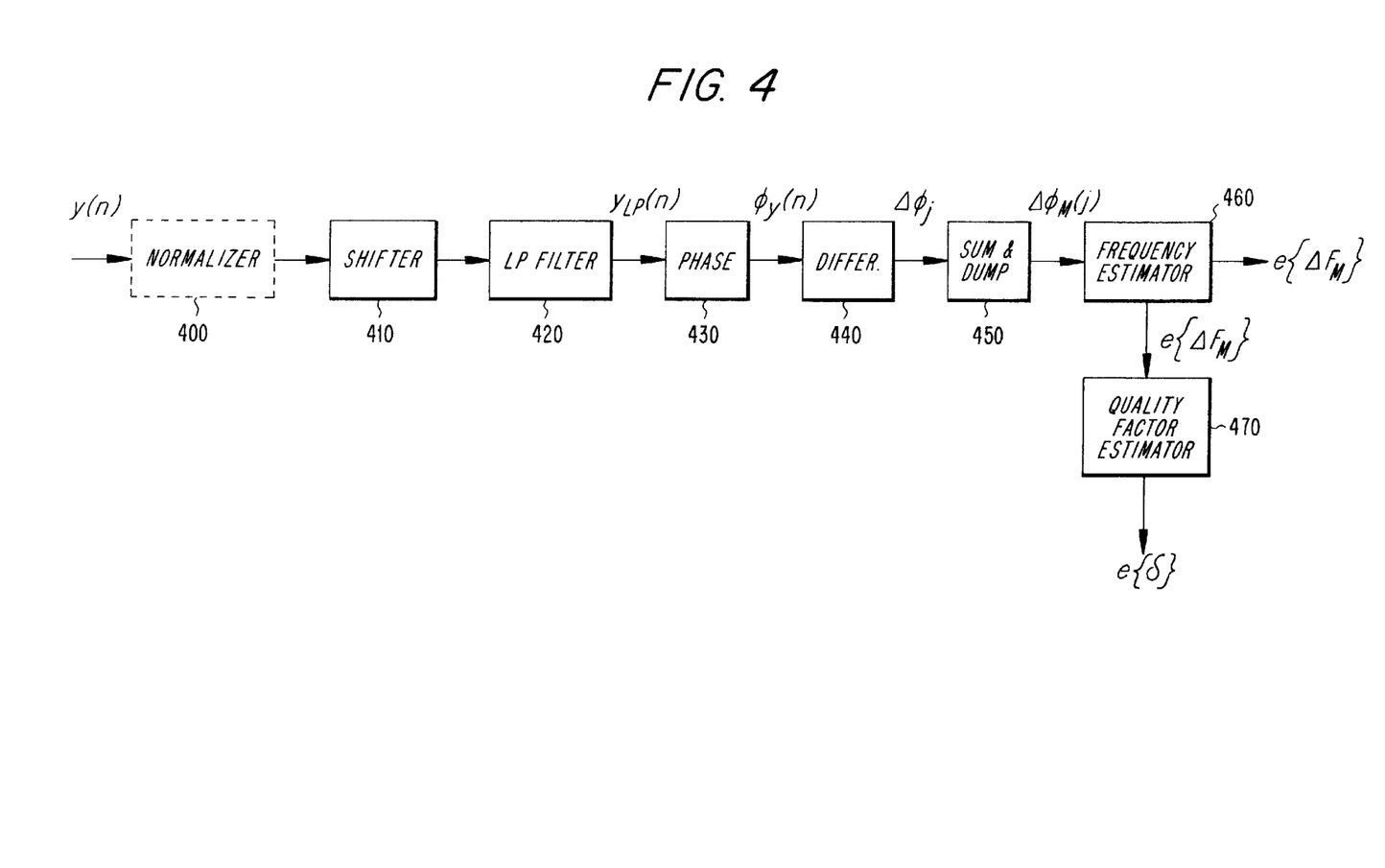
FIG. 4 illustrates an exemplary apparatus for estimating a frequency offset and a quality factor.

FIG. 4 illustrates an exemplary apparatus for estimating a frequency offset and a quality factor. As shown in FIG. 4, a detected frequency synchronization signal y(n) is normalized in a Normalizer 400 which limits the dynamic range of the detected signal. The Normalizer 400 may be implemented with tables in the same manner as the Normalizer 210 shown in FIG. 2. To obtain an optimal frequency offset estimation, ideally only samples of the FCB should be used. Thus, the received signal can be prefiltered in a frequency selective filter to select the frequency band corresponding to the FCB to discriminate the FCB from noise and thus enhance the signal to noise ratio.

The received signal can be shifted from the center frequency of 67.7 KHz to the baseband by a Shifter 410 and then the shifted signal can be lowpass filtered in an LP Filter 420. The Shifter 410 can be implemented as a Derotator 222 as shown in FIG. 2. The phase $\phi_{yLP}(n)$ of the filtered signal $y_{LP}(n)$ is then measured in the Phase Measuring Circuit 430. The phase difference $\Delta\phi_y(n)$ between successively collected samples of the received and demodulated frequency synchronization signal is computed in a known manner in the Differentiator 440. The Differentiator 440 can be conveniently implemented by, for example, a high pass filter. Each phase difference is added to accumulated previous phase differences by the Sum & Dump Circuit 450. The Sum & Dump Circuit 450 can be implemented by an adder and a filter, such as a FIR filter, with M coefficients set to unity. Alternately, the phase differences can be added by other devices, e.g., an integrate and dump circuit, a resettable integrator, or a low pass filter. When M phase differences have been added, the sum is "dumped", i.e., output by the Sum & Dump Circuit 450 to a Frequency Offset Estimation Circuit 460.

The Frequency Estimation Circuit 460 computes a weighted sum of groups of phase differences between successively collected samples of the detected frequency synchronization signal to estimate the frequency offset, thus compensating for phase variations between successively collected samples of the frequency synchronization signal, i.e., performing phase unwrapping, without requiring a memory to keep track of phase shifts. The Frequency Estimation Circuit 460 can be implemented with a FIR filter with delay elements, accumulators, and coefficients $c_k$ where:

$$c_k = \sum_{j=k}^{N-1} b_j, k = 0, 1, 2, \ldots, N-1 \quad (21)$$

and $$b_k = \left(\frac{12M}{T_s N_0 (N_0^2 - 1)}\right)\left(k - \frac{N-1}{2}\right)\frac{F_s}{2\pi}, k = 0, 1, 2, \ldots, N-1. \quad (22)$$

As shown in FIG. 4, a Quality Factor Estimation Circuit 470 computes the quality factor estimate $e\{\delta\}$ according to Equation 20 above. If the estimated quality factor $e\{\delta\}$ indicates that the estimated frequency offset is not sufficiently accurate, i.e., the estimated quality factor is greater than a predetermined threshold, the estimated frequency offset can be adjusted, e.g., computed again.

The Quality Factor Estimation Circuit 470 can be implemented with N subtractors for computing N differences between each of the N groups of M phase differences and the estimated frequency offset, N absolute value circuits for computing the absolute values of the N differences, and an adder for adding the N absolute values to produce the estimated quality factor $e\{\delta\}$ as described in the above mentioned U.S. Pat. No. 6,104,767. Although shown as being separate from the Frequency Offset Estimation Circuit 460 for ease of illustration and explanation, it should be understood that the Quality Factor Estimation Circuit 470 and the Frequency Offset Estimation Circuit 460 can be combined in a single device.

Figure 5A:
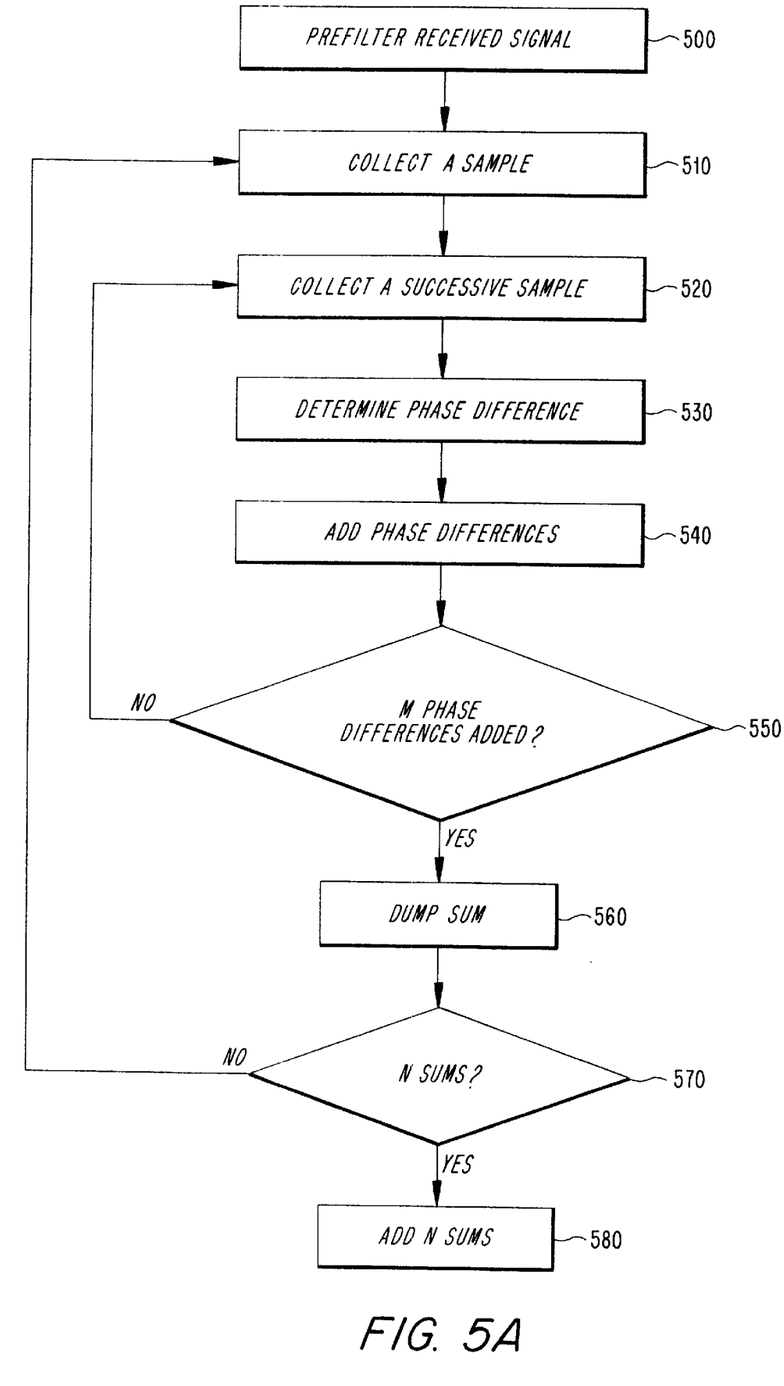
FIG. 5A illustrates an exemplary method for estimating a frequency offset.

FIG. 5A illustrates an exemplary method for estimating a frequency offset. The method begins at step 500, at which a received signal is prefiltered to improve detection of the frequency synchronization signal. Next, at step 510, a sample of the detected frequency synchronization signal is collected. At step 520, a successive sample is collected. At step 530, the phase difference between the successively collected samples is computed. Next, at step 540, the phase difference is added to other accumulated phase differences. At step 550, a determination is made whether M phase differences have been added. If not, the process returns to step 520. If M phase differences have been added, the sum of the M phase differences is dumped at step 560. Next, at step 570, a determination is made whether N sums of M phase differences have been dumped. If not, the process returns to step 510, and a new sample is collected. If so, the N sums are added at step 580. According to an exemplary embodiment, this step can be performed by computing a weighted average of the N sums using, for example, linear regression, and the result is the estimated frequency offset.

Figure 5B:
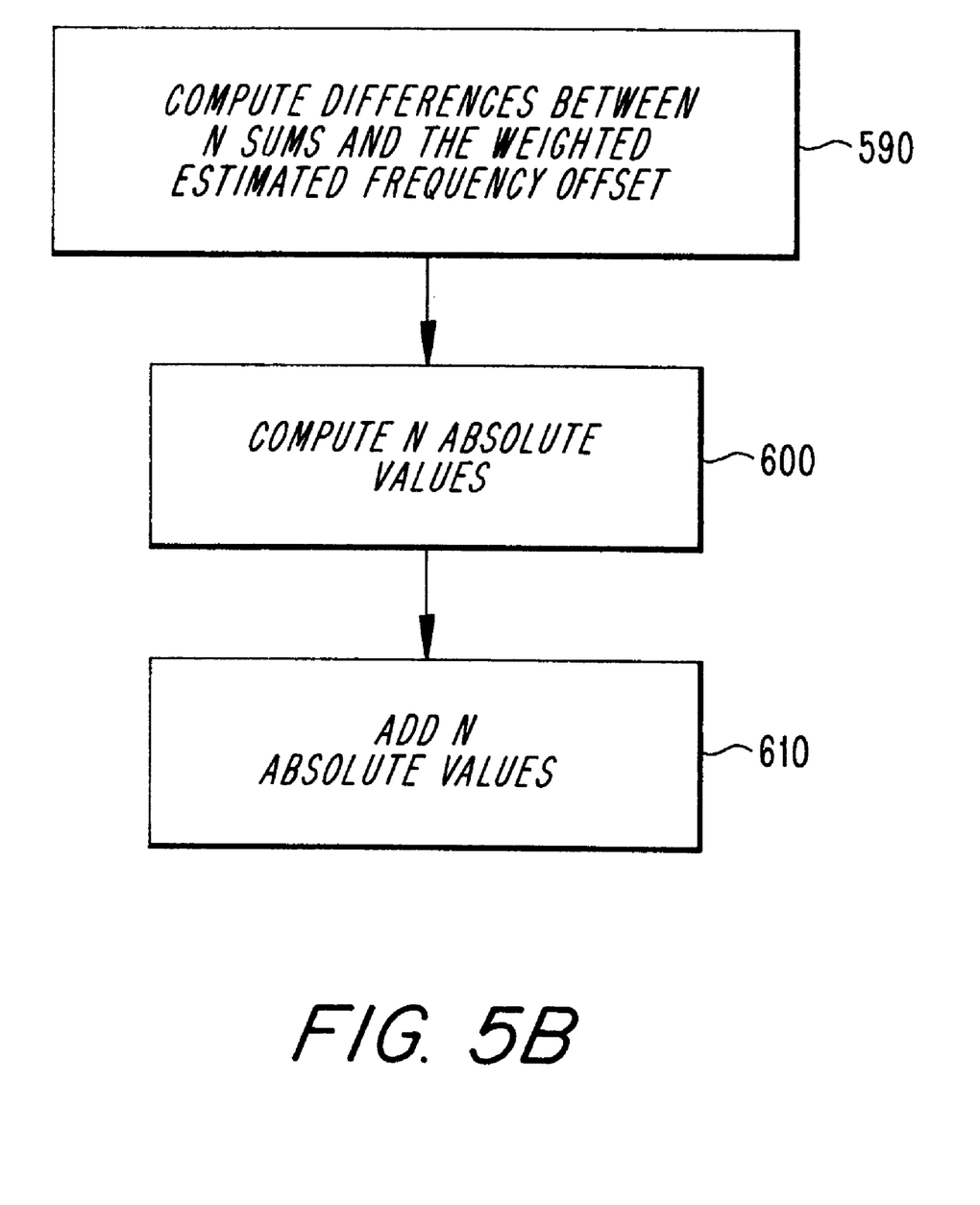
FIG. 5B illustrates an exemplary method for estimating a quality factor.

FIG. 5B illustrates an exemplary method for a estimating quality factor. The process starts after the frequency offset has been estimated. At step 590, the estimated frequency offset, weighted by M, is subtracted from each of the N sums of M phase differences to produce N differences. Next, at step 600, the absolute values of the N differences are computed. Finally at step 610, the N absolute values are added to produce the estimated quality factor.

Techniques such as that described above use the detected frequency synchronization signal to estimate a frequency offset between the carrier frequency of the base station and the frequency reference of the mobile station. It is important to know the location of the frequency synchronization signal among data received at the mobile station, so that the estimation is performed using the actual frequency synchronization signal and not other data.

According to an exemplary embodiment, the location of the frequency synchronization signal can be determined based on a detected frequency synchronization signal, synchronized with an estimated frequency offset and quality factor. This process can be performed in an apparatus such as that shown in FIG. 6A, which may be included in a receiver, e.g., a mobile station.

Figure 6A:
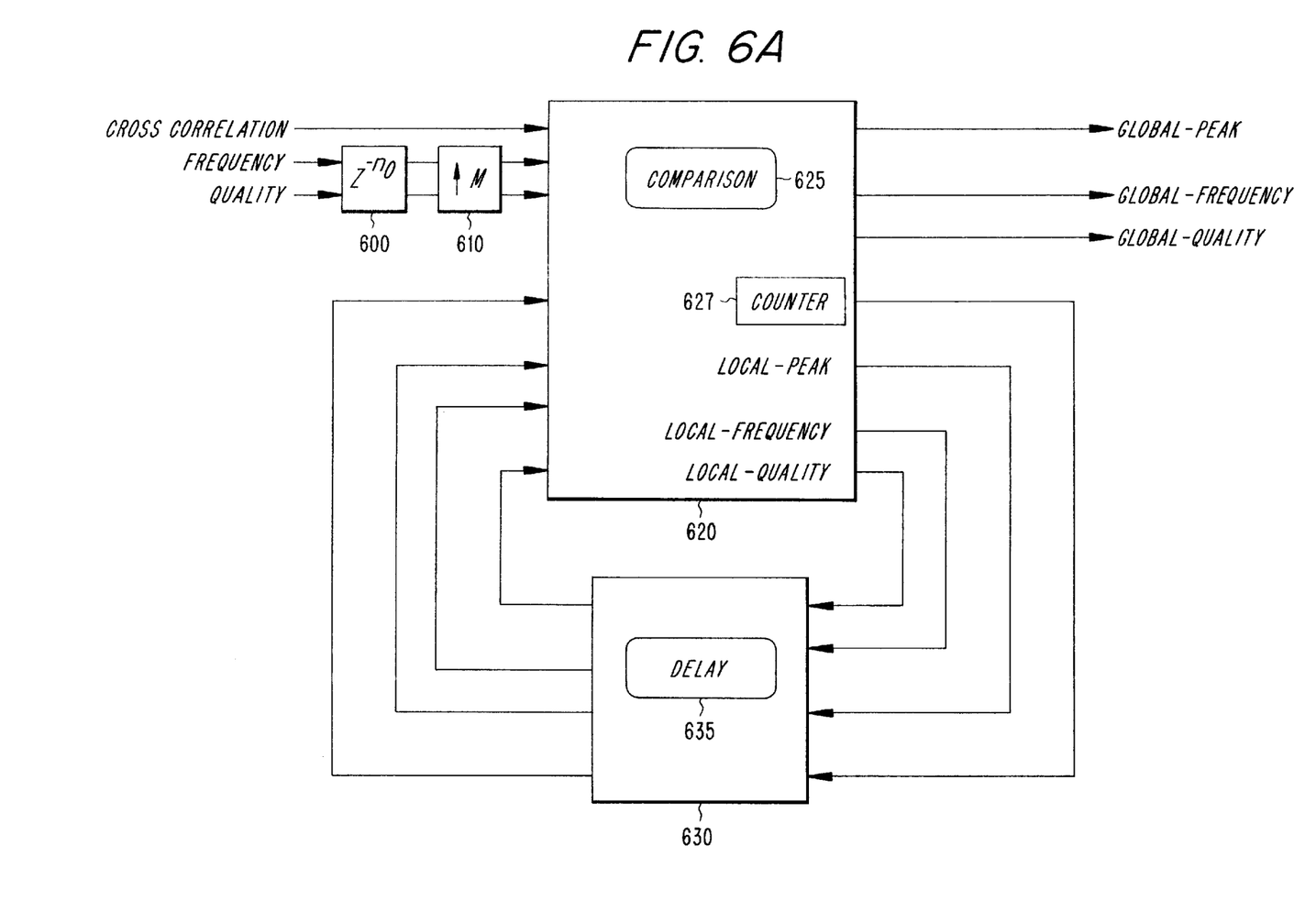
FIG. 6A illustrates an exemplary apparatus for determining a location of a frequency synchronization signal.

Referring to FIG. 6A, the apparatus includes state memories 620 and 630. The state memory 620 receives a signal representing the detected frequency synchronization signal, e.g., the cross-correlation peak value output by the Moving Averager 245 (shown in FIG. 2), and the estimated frequency offset and quality factor values output, e.g., by the Frequency Offset Estimator 460 and the Quality Factor Estimator 470 (shown in FIG. 4), respectively. These values are written into the state memory 630.

A frequency offset estimation method, such as that disclosed in U.S. patent application Ser. No. 6,104,767, decimates the sample rate by M to decrease the number of required parameters for the estimation. Thus, the rates of the estimated frequency offset and quality factor are one Mth of that of the calculated cross-correlation peak value. To account for this, the apparatus according to an exemplary embodiment includes a Filter 610 for expanding the rates of the estimated frequency offset and quality factor by M. In addition, a frequency synchronization signal detection technique, such as that described above, delays the in-phase component, resulting in a delay in the calculated cross-correlation peak value. To account for this, the estimated frequency offset and quality factor are delayed by time $n_0$ in Delay unit 600 prior to expansion so that they are synchronized to the cross-correlation peak value. The Delay unit 600 can be implemented with, e.g., a buffer.

When the estimated frequency offset and quality factor values are expanded and synchronized with the calculated peak value, a procedure is used to determine the location of the frequency synchronization signal by searching for maxima and minima in the cross correlation peak value and quality factor, respectively. The points at which such maxima and minima occur correspond to the locations of the frequency synchronization signals. This is shown in FIG. 6B.

Figure 6B:
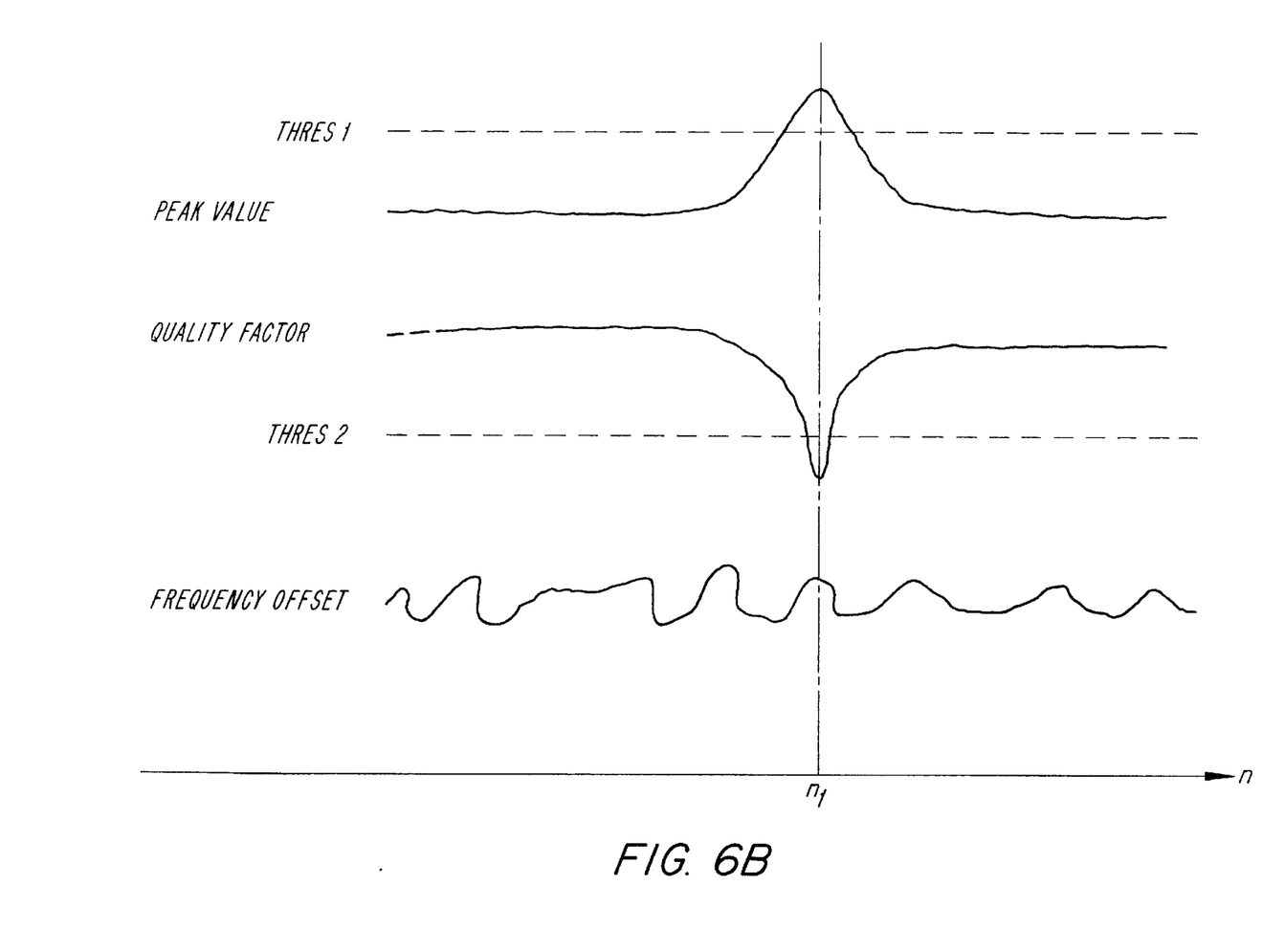
FIG. 6B is a graphical representation of peak values, quality factor values, and frequency offsets over time.

FIG. 6B is a graphical representation of peak values, quality factors and frequency offsets over time. In FIG. 6B, the peak value is at a maximum greater than or equal to the peak threshold, and the quality factor is at a minimum less than or equal to the quality threshold at a time $n_1$. This time $n_1$ corresponds to the location of a frequency synchronization signal. The corresponding frequency offset is shown at time $n_1$. Shortly after this point in time, the peak and quality threshold conditions will not be met, i.e., the peak value will be less than the peak threshold, and the quality factor will be greater than the quality threshold. Then, the maximum peak value and the minimum quality factor at time $n_1$ can be used to indicate the location of frequency synchronization signal.

Referring again the FIG. 6A, local extrema, including local peak, frequency, and quality values are stored in the state memory 620. The local peak, frequency, and quality values correspond to the calculated cross-correlation peak value, estimated frequency offset, and estimated quality factor.

The local peak, frequency, and quality values which are stored in the state memory 620 are written into the state memory 630, e.g., the Delay unit 635, and then read from the state memory 630. The cross-correlation peak value and the quality factor value are compared with predetermined peak and quality thresholds, respectively, e.g., in the Comparison Circuit 625. When both of the threshold conditions are met, i.e., the cross-correlation peak value is greater than or equal to a peak threshold and the quality factor value is less than or equal to a quality threshold, a determination is made, e.g., in the Comparison Circuit 625, whether the cross-correlation peak value read from the Delay unit 635 is less than a successive calculated peak value stored in the state memory 620. If the cross-correlation peak value is less than the successive peak value, the local peak, frequency and quality values are updated with corresponding successive extreme values.

The locations of the peak values are also estimated relative to each other by using a Counter 627 in the state memory 620. The Counter 627 counts the number of incoming values, e.g., from the Moving Averager 245 (shown in FIG. 2), and from the Frequency Offset Estimator 460 and the Quality Factor Estimator 470 (shown in FIG. 4), and is reset when a frequency synchronization signal is detected. The count value is stored in the state memory 630, e.g., in the Delay unit 635.

When either of the predetermined threshold conditions is not met, i.e., the cross-correlation peak value is less than the peak threshold or the quality factor value is greater than the quality threshold, a determination is made, e.g., in the Comparison Circuit 625, whether the local peak value is not equal to zero. If the local peak value is not zero, this indicates that the frequency synchronization signal has been detected. Thus, the local extreme values are written as global extreme values, e.g., to a register, and a frequency synchronization signal having the global peak and quality is assumed to be detected. The local extreme values are thereafter reset to zero. The corresponding estimated frequency offset is also considered to be the frequency offset between the frequency reference of the mobile station and the carrier frequency of the base station. This frequency offset is used to tune the frequency of the mobile station to the carrier frequency of the base station.

Figure 7:
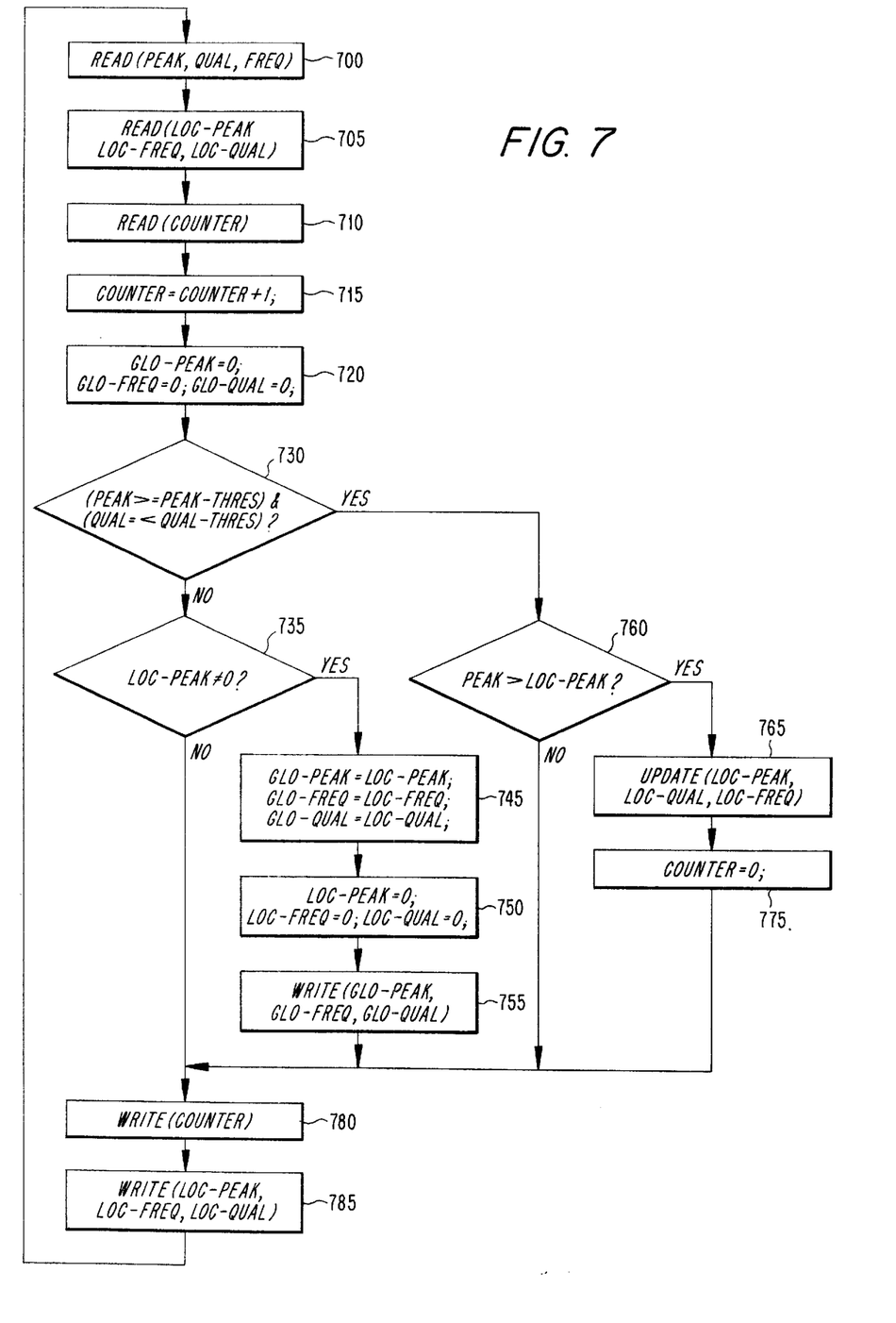
FIG. 7 illustrates an exemplary method for determining a location of a frequency synchronization signal.

FIG. 7 illustrates an exemplary method for determining a location of a frequency synchronization signal. The method begins at step 700 at which the peak, frequency offset, and quality values are read from the state memory 620. At step 705, the local peak, frequency offset, and quality values are read from the state memory 630, e.g., from the Delay unit 635. At step 710, the counter value is read from the state memory 630, e.g., from the Delay unit 635. At step 715, the counter value is updated by adding one to the counter value in the Counter circuit 627. At step 720, the global peak, frequency offset, and quality values are set equal to zero.

At step 730, a determination is made whether the cross-correlation peak value is greater than or equal to a predetermined peak threshold and whether the estimated quality factor value is less than or equal to a predetermined quality threshold. If either of these conditions is not fulfilled, a determination is made whether the local peak value is not equal zero at step 735. If, at step 735, the local peak value is not equal zero, this indicates the local peak value is a maximum value. Thus, the global extreme values are set equal to the local values at step 745, the local peak, frequency, and quality factor values are set equal to zero at step 750, and the global values are written to a register at step 755. The global values are used to tune the frequency reference of the mobile station to the carrier frequency of the base station.

If, at step 730, it is determined that the cross-correlation peak value is greater than or equal to the peak threshold and the estimated quality factor value is less than or equal to the quality threshold, a determination is made whether the successive peak value read from the memory 620 is greater than the local peak value read from the state memory 630 at step 760. If so, the local peak, quality factor and frequency offset values are updated at step 765, and the counter is set to zero at step 775.

From steps 735, 755, and 775 the process proceeds to step 780 at which the counter value is written to the state memory 630. At step 785, the local peak, delay, frequency offset, and quality factor values are written to the state memory 630, and the process returns to step 700.

According to the present invention, a method, apparatus, and system are provided for determining the location of a frequency synchronization signal among data transmitted by a transmitter and received by a receiver. This ensures optimal tuning of the receiver to the carrier frequency of the transmitter.

Although described in an application to a GSM and a CTS system, it will be appreciated by those of ordinary skill in the art that this invention can be embodied in other specific forms without departing from its essential character. For example, the invention is applicable to other mobile communication systems, e.g., systems employing the Digital Cellular System (DCS) standard or the Personal Communication Services (PCS) standard, or any system in which there is a need to detect a frequency synchronization signal. The embodiments described above should therefore be considered in all respects to be illustrative and not restrictive.

I claim:

1. In a communication system including at least one transmitter and at least one receiver, a method for determining a location of a frequency synchronization signal among data transmitted from said at least one transmitter and received by said at least one receiver, the method comprising the steps of:

a) calculating a peak value representing a signal transmitted from said at least one transmitter and detected by said at least one receiver;

b) estimating a frequency offset between a carrier frequency of said at least one transmitter and a frequency reference of said at least one receiver;

c) estimating a quality factor using the estimated frequency offset; and d) determining whether the peak value and the quality factor meet predetermined peak and quality threshold conditions;

e) when both of the predetermined peak and quality threshold conditions are met, storing the peak value, frequency offset, and quality factor and repeating steps a)–d); and f) when either of the predetermined peak and quality threshold conditions is not met, determining the location of the frequency synchronization signal as the location of a stored peak value and a stored quality factor.

2. The method of claim 1, wherein the step of determining whether the peak value and the quality factor meet predetermined peak and quality threshold conditions comprises determining whether the peak value is greater than or equal to the predetermined peak threshold and whether the quality factor is less than or equal to the predetermined quality threshold.

3. The method of claim 1, wherein when either of the predetermined peak and quality threshold conditions is not met, the location of the frequency synchronization signal corresponds to the location of a stored maximum peak value and a stored minimum quality factor.

4. The method of claim 1, further comprising:

when both of the peak and quality threshold conditions are met, determining whether a successive calculated peak value exceeds the stored peak value, and if the successive calculated peak value exceeds the stored peak value, then updating the stored peak value with the successive calculated peak value, and updating the frequency offset and quality factor with successive values.

5. The method of claim 1, further comprising a step of synchronizing the frequency offset and the quality factor with the peak value.

6. The method of claim 1, wherein the step of calculating the peak value comprises:

delaying an in-phase component of the signal transmitted from said at least one transmitter and detected by said at least one receiver;

computing products of the delayed in-phase component and a quadrature component for a predetermined number of samples of the signal transmitted from said at least one transmitter and detected by said at least one receiver; and smoothing the products of the delayed in-phase component and the quadrature component to produce an estimated cross-correlation peak value.

7. The method of claim 1, wherein the step of estimating the frequency offset comprises:

g) determining a phase difference between successively collected samples of the signal transmitted from said at least one transmitter and detected by said at least one receiver;

h) adding the phase difference to accumulated phase differences;

i) repeating steps g)–h) until M accumulated phase differences have been added;

j) dumping the sum of the M accumulated phase differences, resulting in zero accumulated phase differences;

k) repeating steps g)–j) until N sums of M accumulated phase differences have been dumped; and l) adding the N sums of the M accumulated phase differences to produce the estimated frequency offset.

8. The method of claim 7, wherein the step of estimating the quality factor comprises:

computing N differences, each between one of the N sums of the M accumulated phase differences and the estimated frequency offset;

computing absolute values of the N differences; and adding the absolute values to produce the estimated quality factor.

9. The method of claim 8, further comprising a step of expanding the frequency offset and quality factor by a factor M.

10. In a communication system including at least one transmitter and at least one receiver, an apparatus for determining a location of a frequency synchronization signal among data transmitted from said at least one transmitter and received at said at least one receiver, the apparatus comprising:

a comparison circuit for determining whether a calculated peak value, representing a signal transmitted from the transmitter and detected by the receiver, and an estimated quality factor meet predetermined peak and quality threshold conditions; and a memory, wherein when both of the predetermined peak and quality threshold conditions are met, the peak value, an estimated frequency offset, and the quality factor are stored in the memory, and when either of the predetermined peak and quality threshold conditions is not met, the location of the frequency synchronization signal corresponds to the location of a stored peak value and a stored quality factor.

11. The apparatus of claim 10, wherein the comparison circuit determines whether the peak value is greater than or equal to the predetermined peak threshold and whether the quality factor is less than or equal to the predetermined quality threshold.

12. The apparatus of claim 10, wherein when either of the predetermined peak and quality threshold conditions is not met, the location of the frequency synchronization signal corresponds to the location of a stored maximum peak value and a stored minimum quality factor.

13. The apparatus of claim 10, wherein when both of the predetermined peak and quality threshold conditions are met, the comparison circuit determines whether a successive calculated peak value exceeds the stored peak value, and when the successive calculated peak value exceeds the stored peak value, the stored peak value is updated with the successive calculated peak value, and the frequency offset and quality factor stored in the memory are updated with successive values.

14. The apparatus of claim 10, further comprising means for synchronizing the frequency offset and the quality factor with the peak value.

15. The apparatus of claim 10, wherein the calculated peak value is derived from a device comprising:

a delay element for delaying an in-phase component of the signal transmitted from the transmitter and detected by the receiver;

a multiplier for forming a product of the delayed in-phase component and a quadrature component for a predetermined number of samples of the signal transmitted from the transmitter and detected by the receiver; and a circuit for smoothing the product to produce an estimated cross-correlation peak value.

16. The apparatus of claim 10, wherein the estimated frequency offset is derived from a device comprising:

a differentiator for computing a phase difference between successively collected samples of a frequency synchronization signal transmitted by said at least one transmitter and detected by said at least one receiver;

an adder for adding the phase difference to accumulated phase differences, wherein phase differences of successive collected samples are computed and added to accumulated phase differences until M accumulated phase differences have been added at which point the adder dumps the sum of the M phase differences, resulting in zero accumulated phase differences; and a frequency offset estimation circuit for receiving the dumped sum of M phase differences, wherein the differentiator continues computing the phase differences of successively collected samples, and the adder continues accumulating and adding phase differences and dumping the sum of M phase differences until N sums of M phase differences have been dumped, at which point the frequency offset estimation circuit adds the N sums of the M phase differences to produce the estimated frequency offset.

17. The apparatus of claim 16, wherein the quality factor is derived from a device comprising:

N subtractors for computing N differences, each of the N differences being a difference between a respective one of the N sums of the M accumulated phase differences and the estimated frequency offset;

N circuits for computing the absolute values of the N differences; and an adder for adding the N absolute values to produce the estimated quality factor.

18. The apparatus of claim 17, further comprising means for expanding the frequency offset and the quality factor by a factor M.

19. A system for determining the location of a frequency synchronization signal among data transmitted from a transmitter and received by a receiver, comprising:

a peak value calculation device that calculates a peak value representing a signal transmitted from the transmitter and detected by the receiver;

a frequency offset estimation device that estimates a frequency offset between a carrier frequency of the transmitter and a frequency reference of the receiver;

a quality factor estimation device that estimates a quality factor using the estimated frequency offset;

means for determining whether the peak value and the quality factor meet predetermined peak and quality threshold conditions; and means for storing the peak value and quality factor when both of the predetermined peak and quality threshold conditions are met, wherein when either of the predetermined peak and quality threshold conditions is not met, the location of the frequency synchronization signal corresponds to the location of a stored peak value and a stored quality factor.

20. The system of claim 19, wherein the means for determining determines whether the peak value is greater than or equal to the predetermined peak threshold and whether the quality factor is less than or equal to the predetermined quality threshold.

21. The system of claim 19, wherein the location of the frequency synchronization signal corresponds to the location of a stored maximum peak value and a stored minimum quality factor.

22. The system of claim 19, wherein when both of the peak and quality threshold conditions are met, means for determining whether the peak value and the quality factor meet predetermined peak and quality threshold conditions determines whether a successive peak value exceeds the stored peak value, and if the successive peak value exceeds the stored peak value, the stored peak value is updated with the successive peak value, and the frequency offset and quality factor are updated with successive values.

23. The system of claim 19, further comprising means for synchronizing the frequency offset and quality factor with the peak value.

24. The system of claim 19, wherein the peak value calculation device comprises:

a delay element for delaying an in-phase component of the signal transmitted from the transmitter and detected by the receiver;

a multiplier for forming a product of the delayed in-phase component and a quadrature component for a predetermined number of samples of the signal transmitted from the transmitter and detected by the receiver; and a circuit for smoothing the product to produce an estimated cross-correlation peak value.

25. The system of claim 19, wherein the frequency offset estimation device comprises:

a differentiator for computing a phase difference between successively collected samples of a frequency synchronization signal transmitted by the transmitter and detected by the receiver;

an adder for adding the phase difference to accumulated phase differences, wherein phase differences of successive collected samples are computed and added to accumulated phase differences until M accumulated phase differences have been added at which point the adder dumps the sum of the M phase differences, resulting in zero accumulated phase differences; and a frequency offset estimation circuit for receiving the dumped sum of M phase differences, wherein the differentiator continues computing the phase differences of successively collected samples, and the adder continues accumulating and adding phase differences and dumping the sum of M phase differences until N sums of M phase differences have been dumped, at which point the frequency offset estimation circuit adds the N sums of the M phase differences to produce the estimated frequency offset.

26. The system of claim 25, wherein the quality factor estimation device comprises:

N subtractors for computing N differences, each of the N differences being a difference between a respective one of the N sums of the M accumulated phase differences and the estimated frequency offset;

N circuits for computing the absolute values of the N differences; and an adder for adding the N absolute values to produce the estimated quality factor.

27. The system of claim 26, further comprising means for expanding the frequency offset and the quality factor by a factor M.

* * * * *